No. 696,770. Patented Apr. 1, 1902.
A. SPENCER.
STEAM BOILER.
(Application filed July 18, 1901.)
(No Model.) 6 Sheets—Sheet 2.
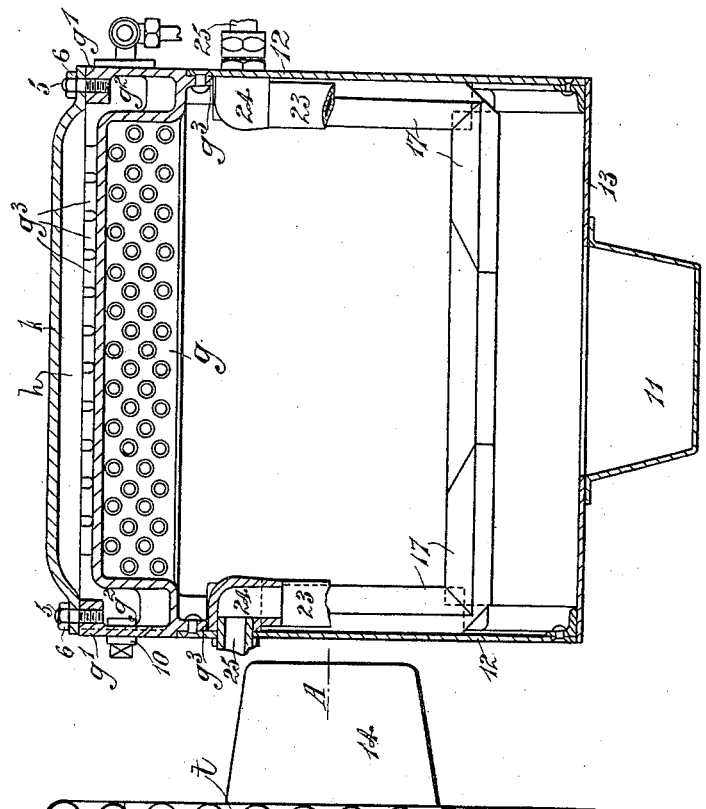
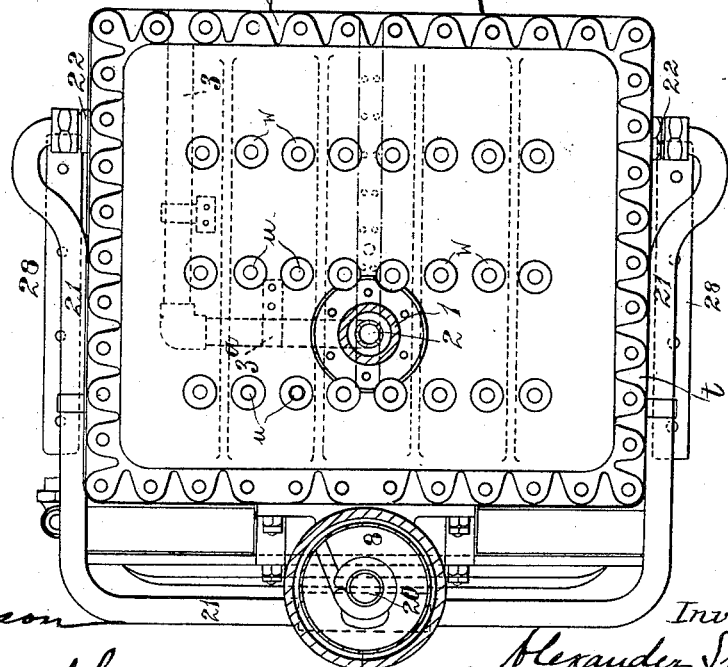
Witnesses,
Inventor,
Alexander Spencer
by H. Parker Smith Atty.

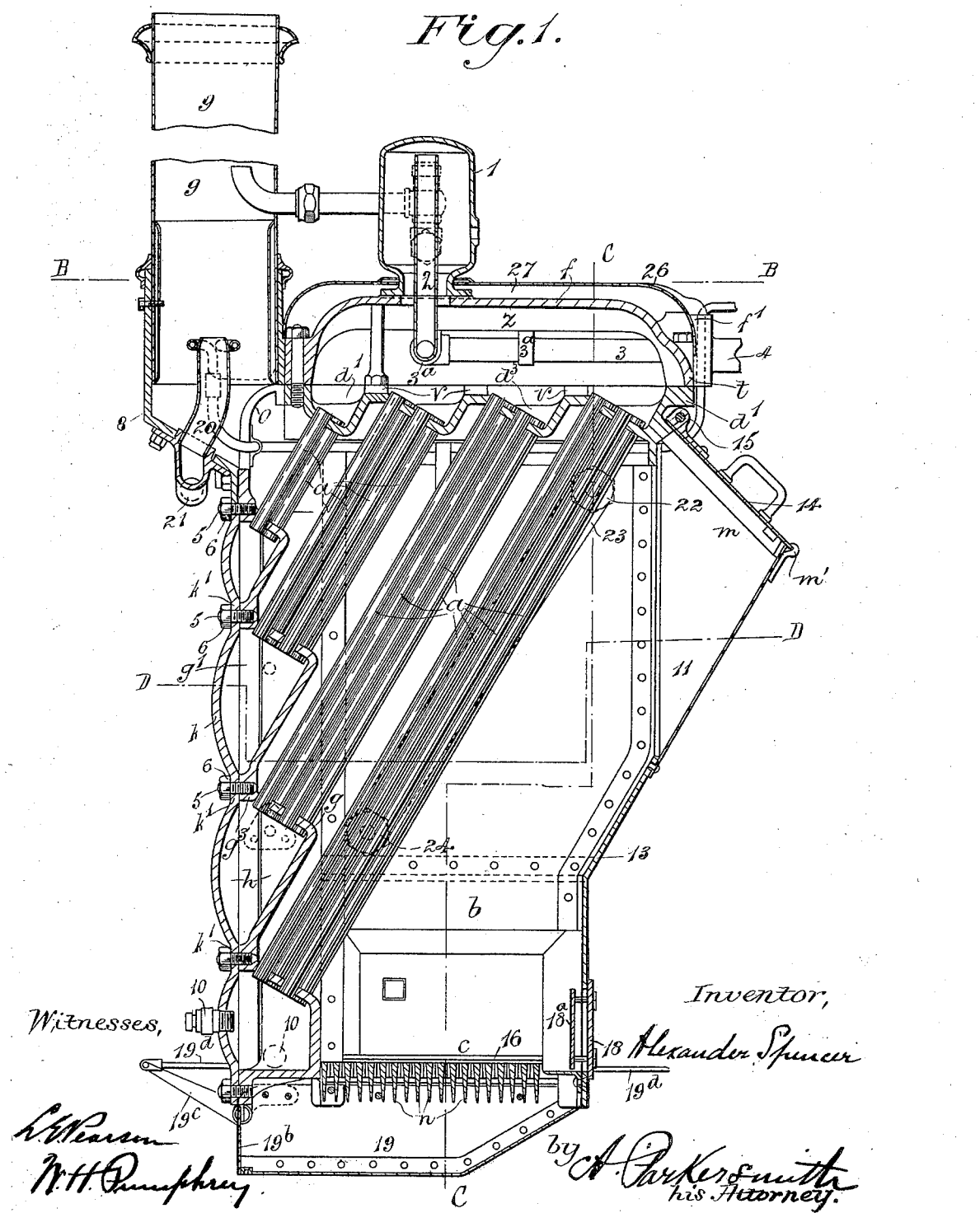

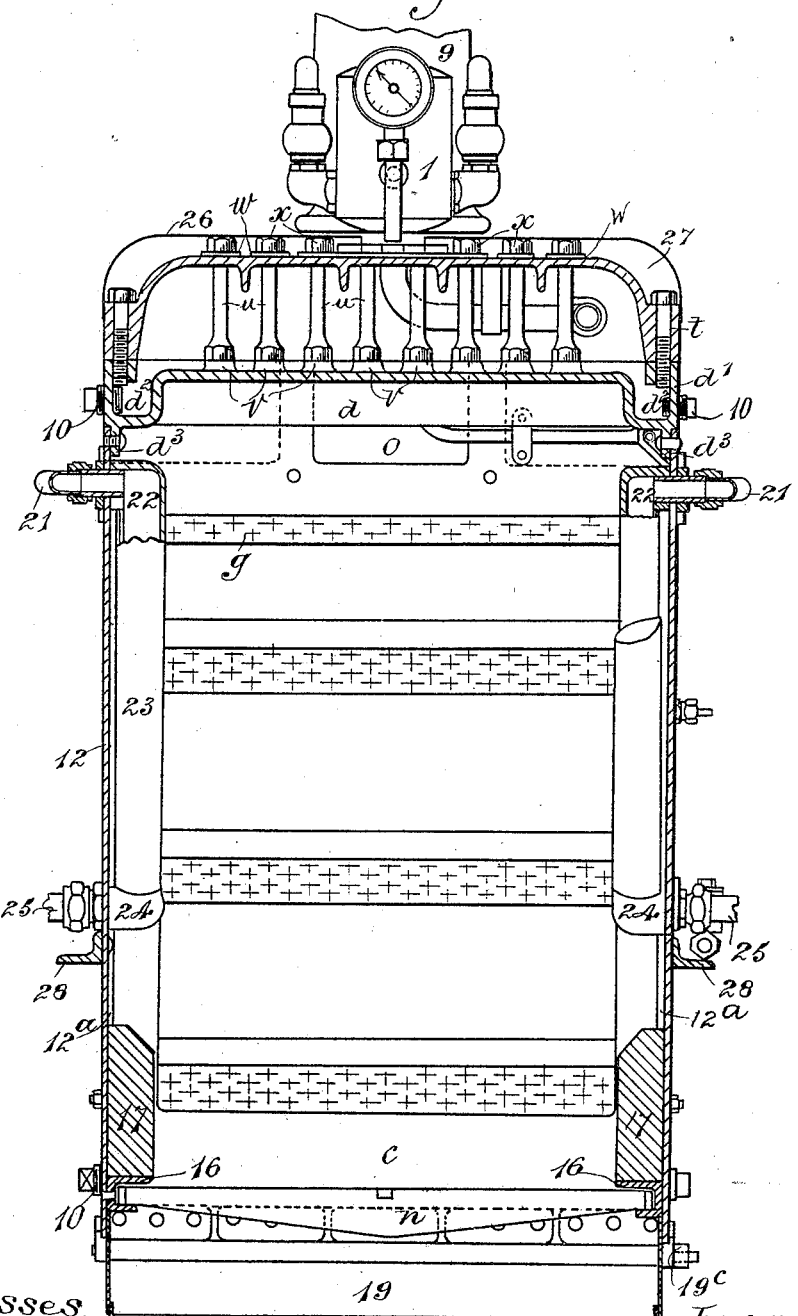

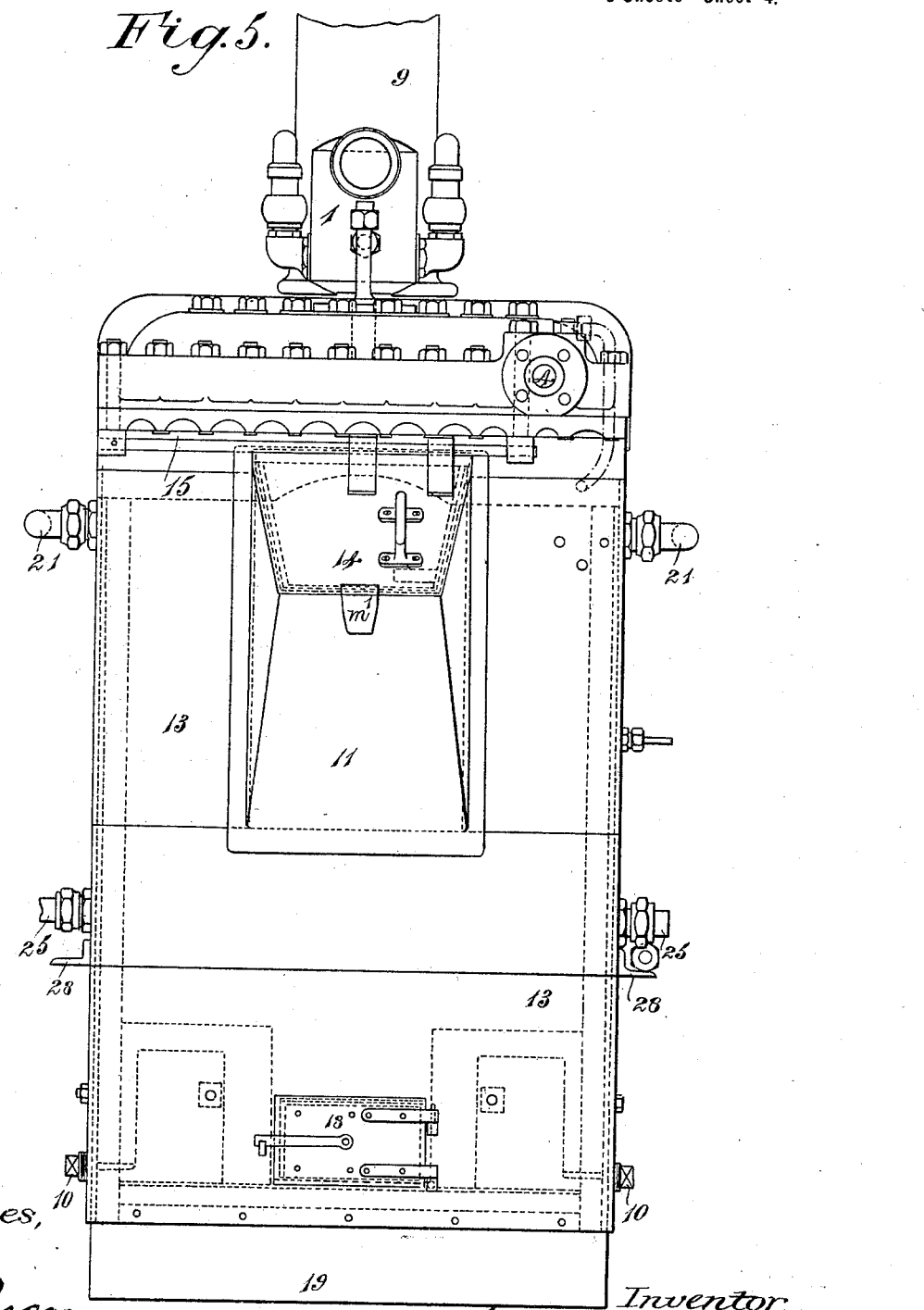

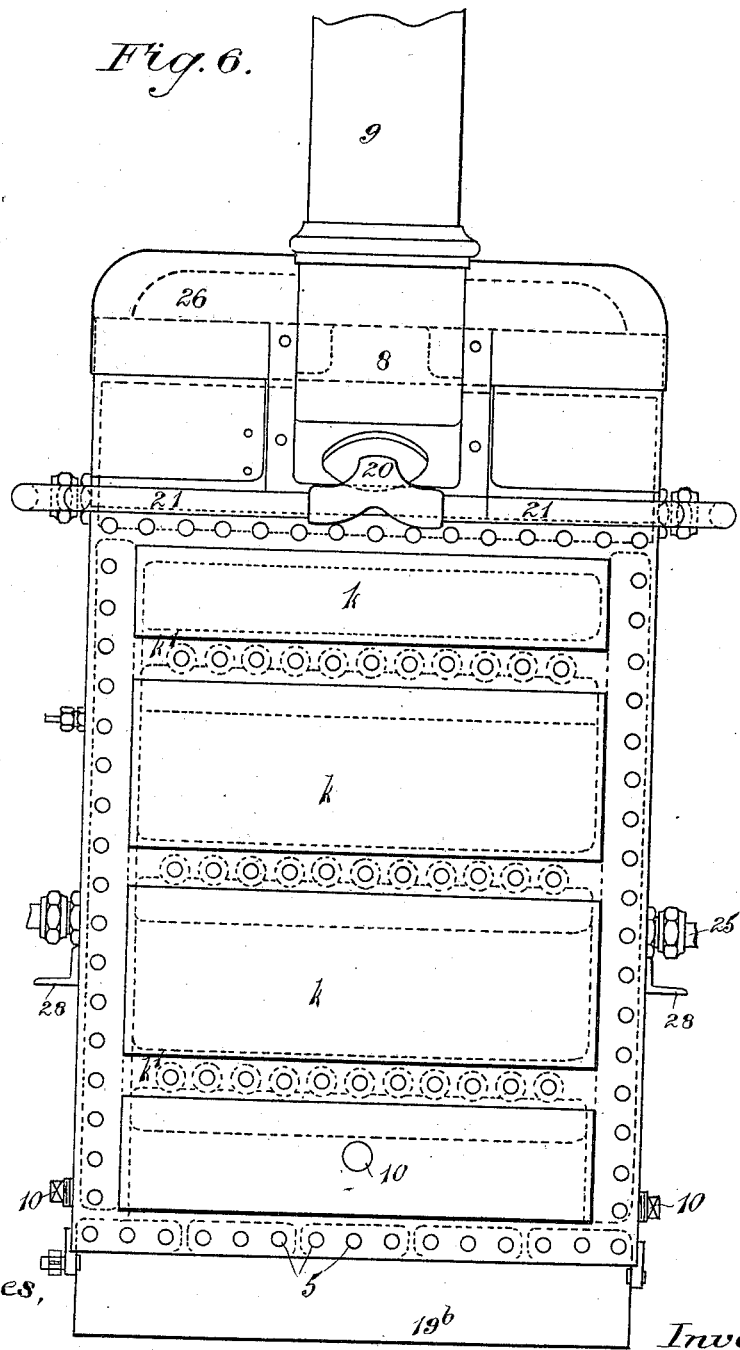

No. 696,770. Patented Apr. 1, 1902.
A. SPENCER.
STEAM BOILER.
(Application filed July 18, 1901.)
(No Model.) 6 Sheets—Sheet 6.

Witnesses, Inventor,
Alexander Spencer
by A. Parker Smith
his Attorney.

UNITED STATES PATENT OFFICE.

ALEXANDER SPENCER, OF LONDON, ENGLAND.

STEAM-BOILER.

SPECIFICATION forming part of Letters Patent No. 696,770, dated April 1, 1902.

Application filed July 18, 1901. Serial No. 68,785. (No model.)

*To all whom it may concern:*

Be it known that I, ALEXANDER SPENCER, a subject of the King of Great Britain and Ireland, residing in the city of London, England, have invented Improvements in Steam-Boilers, of which the following is a specification.

This invention has reference to improvements in steam-boilers of the water-tube type; and it has for its object to produce an efficient steam-boiler of this type that is specially suitable for use in connection with steam-propelled road-vehicles, but is suitable also for other uses, and which can be readily constructed, fired, cleaned, and controlled.

The invention consists, for these and other objects, in certain combinations and arrangements of parts, as will be hereinafter fully described, and then more specifically pointed out in the claims.

Figure 7:
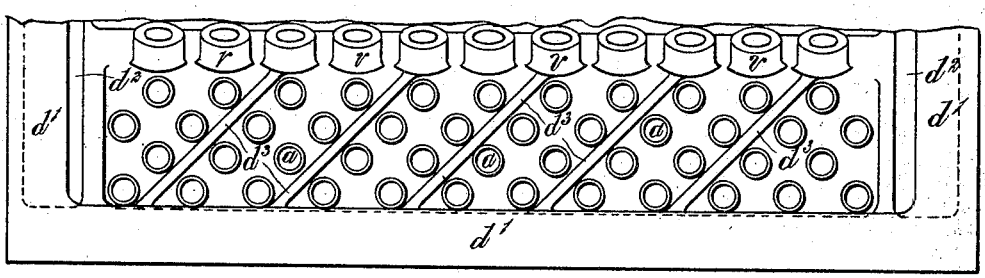
Figure 8:
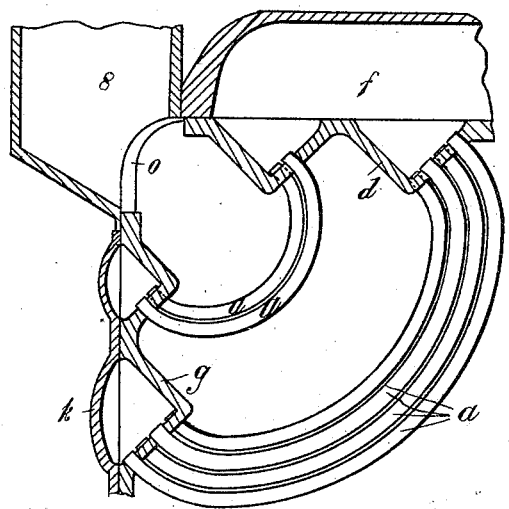

In the accompanying illustrative drawings, Figure 1 is a vertical section taken on the line A A of Fig. 2; and Fig. 2 is a sectional plan taken on the line B B of Fig. 1, with the top casing removed, showing a steam-boiler constructed according to this invention. Fig. 3 is a vertical section on the line C C of Fig. 1, but with the water-tubes removed. Fig. 4 is a horizontal section on the line D D of Fig. 1, but with the water-tubes removed. Figs. 5 and 6 are respectively back and front elevations of the boiler. Fig. 7 is a plan of part of an upper tube-plate. Fig. 8 is a detail view showing a modification.

The improved steam-boiler shown in Figs. 1 to 7, inclusive, comprises a number of groups of straight water-tubes $a$ of different lengths arranged at a distance apart in an inclined position one above the other at one side of the combustion-chamber $b$ and over a fire grate or box $c$, the upper ends of the tubes being secured to the stepped lower side $d$ of an upper horizontally-arranged steam and water vessel $e$, having a removable top or cover $f$, and the lower ends of the tubes being secured to the stepped inner side $g$ of a vertically-arranged water-box $h$, provided with a removable outer side or cover $k$, the opposite side of the combustion-chamber $b$ being provided near the top with a normally closed opening $m$, through which fuel can be introduced and allowed to fall onto the fire upon the fire-grate $n$, and an exit-opening $o$ for hot gases and products of combustion being provided between the adjacent parts of the horizontal steam and water vessel $e$ and the vertical water-box $h$. As will be seen, the arrangement is such that the ends of the water-tubes $a$ can be secured to the stepped tube-plates $d$ and $g$ at right angles thereto and that by removing the cover-plates $f$ and $k$ of the vessel $e$ and box $h$ ready access can be gained to the interiors of such tubes for inspecting or cleaning the same, while the arrangement of the fuel-opening $m$ at the upper and usually rear side of the boiler, as shown, admits of the stoking being done in a convenient manner by a person standing on the road-vehicle to which the boiler may be applied.

In the particular construction of boiler shown the lower part of the upper steam and water vessel $e$ is made as a casting or stamping of suitable metal — for example, phosphor-bronze — with a stepped lower side $d$ and with an upwardly-extending horizontally-flanged rim $d'$, arranged to form two channels $d^2$ along two opposite sides of the stepped portion $d$. The top or cover $f$ of the said steam and water vessel $e$, which may also be a casting or stamping, is made of inverted-dish shape, with a horizontal flange $t$, by which it can be bolted to the flange $d'$ on the lower part $d$. The two parts $d$ and $f$ are stayed together by stay-bolts $u$, the lower ends of which are secured, as by screwing, in bosses $v$ on the upper side of the stepped tube-plate $d$, and the upper ends of which pass through the cover-plate $f$ and are provided with washers $w$ and nuts $x$. The stepped plate $d$ is also strengthened by diagonally-arranged ribs $d^3$, Fig. 8. The cover $f$ is or may be also strengthened by ribs $z$, formed on and depending from its under side.

To the upper side of the cover $f$ is secured a steam-dome 1, from the upper part of which steam can be led away by a steam-pipe comprising a vertical portion 2, that extends up into the said steam-dome and terminates near the top thereof, and a lower horizontal portion 3, the outer end of which is fixed in one side — say the rear side — of the cover $f$, adjacent to a faced surface $f'$ thereon, over which the flanged end of an external steam-delivery pipe 4 is fixed. $3^a$ represents supports for the said steam-pipe.

The vertical water-box $h$, which is arranged at the front of the boiler and may be also made of a casting or stamping of suitable metal—for example, phosphor-bronze—is formed with a stepped inner side wall $g$, as before stated, and with a flanged rim $g'$, arranged to form two vertical channels $g^2$ along the two opposite sides of the stepped portion. The upper ends of these channels $g^2$ are in communication with the forward ends of the side channels $d^2$ in the upper vessel $e$, so that water can readily flow direct from the vessel $e$ to the box $h$, while water can flow from the box $h$ to the vessel $e$ through the water-tubes $a$. The outer removable cover-plate $k$ of the said vessel $h$, which may be of wrought-iron or steel plate, is, as shown in Fig. 1, formed with a number of outwardly curved or convex portions for the purpose of stiffening it and with flat intermediate portion $k'$, by which it can be fixed to bosses $g^3$ on the outer side of the stepped plate $g$ by studs 5 and nuts 6, the edges of the said cover-plate $k$ being similarly connected to the flanged rim $g'$ of the water-box. The stepped plate $g$ is strengthened by ribs $g^4$. The flanged upper end of the water-box $h$ is made wide and curved, so as to bear against the adjacent end of the upper steam and water vessel $e$, as shown in Fig. 1, and is formed with a large centrally-arranged opening 10 for the exit of hot gases and products of combustion. Over this opening is secured the lower end portion or base 8 of a vertical chimney. This lower portion or base may, as shown, be made as a casting closed at the bottom and open at one side and into which the remaining portion 9 of the chimney can be readily slipped, so that it can when desired be easily removed. Each of the two vessels $e$ and $h$ is formed with one or more holes, which, or each of which, is normally closed by a removable plug 10, and through which the corresponding vessel can be emptied when desired.

The groups of straight water-tubes $a$ are secured in any suitable manner to the oppositely-arranged flat parallel portions of the two-stepped tube-plates $d$ and $g$, the longest tubes being nearest the fire and inclined upwardly and backwardly at an angle of, say, about forty-five degrees over the fire-grate $n$, the shortest group of water-tubes being uppermost and some of them extending across the gas-exit opening $o$, leading to the chimney 9.

The sides and rear walls 12 and 13, respectively, of the boiler are formed by metal plates. To the upper ends of the side plates are secured the side flanges $d^3$ of the upper steam and water vessel $e$, Fig. 3, and to the front portions of the said side plates are secured the side flanges $g^3$ of the vertical water-box $h$, Fig. 4. The said side walls are lined with refractory material $12^a$. The rear wall 13, which may also be partly lined with refractory material, is partly vertical and partly inclined in an upward and backward direction (see Fig. 1) and formed at its upper central portion with an inclined fuel-feeding chute 11, having an opening $m$ at the top. The top of this chute is provided with a cover 14, that is preferably hinged at its upper end to a transverse rod 15, so that it can be turned upward, and is supported in an inclined position when closed.

$m'$ is a catch for holding the door down on its seat. In the example the door is arranged to be moved laterally on the rod 15 to enable it to be disengaged from the catch $m'$ to open it and also to fix it after it has been opened and again closed.

The fire-bars $n$ are carried by suitable end bearers 16, Fig. 3, secured to the side walls 12 of the boiler, and the space above them for a suitable height is provided with a thick lining 17 of refractory material, such as firebrick, to form a fire-box that protects the lower ends of the water-tubes $a$ in the group nearest the fire and the adjacent part of the water-box and also the lower portions of the side and rear end walls of the boiler from direct and injurious contact with the burning fuel. Extending through the rear wall 13 of the boiler and the fire-box 17 is an opening that is normally closed by a door 18, shown as a hinged door with an inner baffle-plate $18^a$, and through which the fire-box can be cleared out when desired, the bottom of the said opening being nearly level with the top of the fire-grate $n$.

To the lower end of the boiler constructed as described may be secured an ash-pan 19, that has an inclined closed rear end $19^a$ and is provided at its front end with an adjustable door $19^b$, capable of being worked by a lever-arm $19^c$ and a rod $19^d$.

For creating a draft through the fire the chimney is provided with an exhaust-steam pipe 20, that extends down through the closed lower end of the base 8 of the chimney and is connected in the particular arrangement shown to two pipes 21, that extend laterally and are bent around the two sides of the boiler and are connected through two tubular connections 22, extending through and fixed to the two side walls 12 of the boiler, to two inclined tubes 23, that are located within the boiler-casing, adjacent to the side walls thereof, and are connected at their lower ends through two similar tubular connections 24, fixed in the side walls of the boiler, to external pipes 25, leading to the exhaust of the cylinder or cylinders of the steam-engine supplied with steam from the steam-boiler. By this means the exhaust-steam on its passage from the engine to the chimney 9 is heated, so as to become practically invisible when discharged into the external atmosphere.

Instead of using straight water-tubes curved water-tubes may be employed, as shown in Fig. 8, the stepped plates $d$ and $g$ being arranged to suit.

The boiler in each case is provided with the usual fittings, such as water and pressure gages, and so on, and the top of the steam and water vessel may be covered by a sheet-metal casing 26, arranged to form with the cover f an air-space 27. The sides of the boiler may be provided with horizontally-arranged angle-irons 28 to admit of its being conveniently mounted on a vehicle with its lower part suspended.

What I claim is—

1. In a steam-boiler, the combination of an upper steam and water vessel having a stepped lower side, an upwardly-extending water-box having a stepped inner side, and water-tubes connecting the stepped sides of said vessel and box.

2. In a steam-boiler, the combination of an upper steam and water vessel having a stepped lower side, an upwardly-extending water-box having a stepped inner side, and inclined groups of straight water-tubes connected to the stepped sides of said vessel and box.

3. A steam-boiler comprising an upper steam and water vessel having a stepped lower side, an upwardly-extending water-box having a stepped inner side, a combustion-chamber communicating with a gas-exit passage between said vessel and box, and water-tubes arranged at one side of and above said combustion-chamber and connected to the stepped sides of said vessel and box.

4. A steam-boiler comprising an upper steam and water vessel having a stepped lower side, an upwardly-extending water-box having a stepped inner side, a combustion-chamber communicating with a gas-exit passage between said vessel and box, and a number of groups of straight water-tubes of different lengths arranged in an inclined position at one side of and above said combustion-chamber and connected to the stepped sides of said vessel and box.

5. A steam-boiler comprising an upper steam and water vessel having a stepped lower side, an upwardly-extending water-box having a stepped inner side, a combustion-chamber communicating with a gas-exit passage between said vessel and box and provided near its top with a normally closed fuel-feeding opening, and a number of groups of water-tubes of different lengths arranged in an inclined position at one side of and above said combustion-chamber and connected to the stepped sides of said vessel and box.

6. A steam-boiler comprising an upper steam and water vessel having a stepped lower side, an upwardly-extending water-box in communication with said vessel and having a stepped inner side, a combustion-chamber communicating with a gas-exit passage between said vessel and box and provided at its opposite side with a fuel-feeding chute extending downward from its upper part, and a number of groups of straight water-tubes spaced apart in an inclined position at one side of and above said combustion-chamber and connected to the stepped sides of said vessel and box, substantially as described.

7. In a steam-boiler, the combination of an upper steam and water vessel having a stepped lower side, a readily-removable cover, and stays between said stepped lower side and cover, an upwardly-extending water-box in communication with said vessel and having a stepped inner side and a readily-removable cover having outwardly curved or convex portions and flat intermediate portions secured to the adjacent stepped inner side of the box, and a number of groups of water-tubes connected to the stepped sides of said vessel and box.

8. In a boiler, the combination of an upper steam and water vessel comprising a lower part having a stepped lower side and an upwardly-extending flanged rim arranged to form two channels along two opposite sides of the stepped portion, an inverted-dish-shaped cover adapted to be secured to the flanged rim of the lower part of the vessel, and stays connecting said lower stepped part and cover, an upwardly-extending water-box comprising an inner part having a stepped inner side and flanged rim arranged to form two upwardly-extending channels that are located at the two opposite sides of the stepped portion and are in communication at the top with the two channels in the lower part of said steam and water vessel, and an outer removable cover secured to the flanged rim of the inner part, and water-tubes connected to the stepped sides of said vessel and box, substantially as described.

9. A steam-boiler comprising a casing having vertical side walls and a rear wall provided with a fuel-feeding opening near the top, said walls being arranged to form a combustion-chamber, an upper steam and water vessel having a laterally-flanged stepped lower side secured to the upper ends of the said vertical side walls, an upwardly-extending water-box having a laterally-flanged stepped inner side secured to the front ends of said side walls, and a flanged upper end connected to said vessel and formed with a gas-exit opening, groups of water-tubes connected to the stepped sides of said vessel and box, and a fire-grate at the bottom of said combustion-chambers and below said water-tubes, substantially as described.

10. A steam-boiler comprising a combustion-chamber the rear wall of which is provided with an inclined fuel-feeding chute and cover, an upper steam and water vessel having a flanged lower side secured to the top of the side walls of said combustion-chamber, a vertical water-box having a flanged inner stepped side secured to the front ends of said side walls and an upper flanged part connected to the front end of said water-box and formed with a gas-exit opening, a fire-grate and fire-box at the bottom of said combustion-chamber, a chimney having its lower end secured over said gas-exit opening, and inclined groups of straight water-tubes connected to the stepped sides of said vessel and box, substantially as described.

11. A steam-boiler having a horizontally-arranged steam and water vessel at its upper end, a vertical water-box at its front end, and a covered inclined fuel-feeding chute extending downward from near the top of its rear end, groups of water-tubes connecting said vessel and box within the combustion-chamber of said boiler and above the fire-box thereof, an upper gas-exit passage in the angle between said vessel and box, and a chimney having its base secured over said gas-exit opening.

12. A steam-boiler having a horizontally-arranged steam and water vessel at its upper end, a vertical water-box at its front end, a covered inclined fuel-feeding chute extending downward from near the top of its rear end, and a fire-grate and ash-pan at its lower end, a fire-box arranged above said fire-grate and formed of refractory material with one or more openings with doors in its sides, inclined groups of water-tubes connecting the lower side of said vessel to the inner side of said box, an upper gas-exit opening located between said vessel and box, and a chimney having its base secured over said opening.

Signed at 77 Cannon street, in the city of London, England, this 18th day of June, 1901.

ALEXANDER SPENCER.

Witnesses:
EDMUND S. SNEWIN,
WM. O. BROWN.